2,783,094

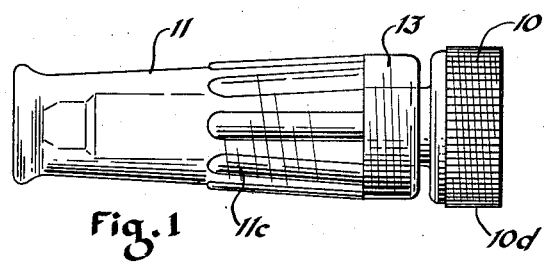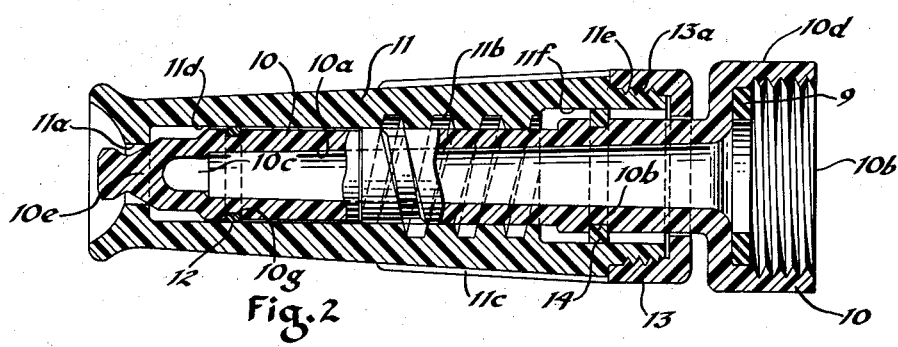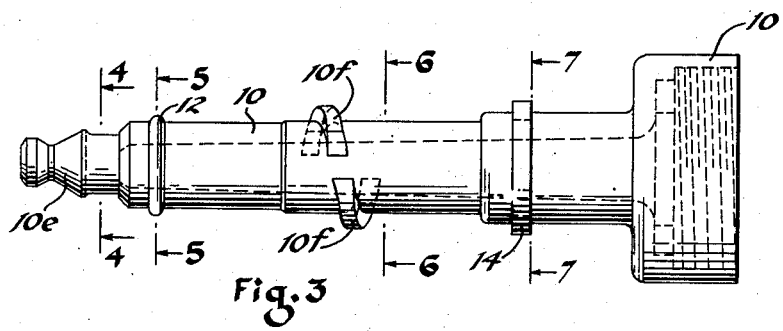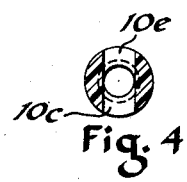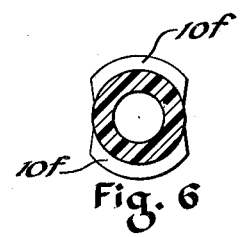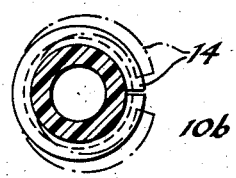
INVENTOR.
Lloyd F. Storie
BY
Hyde, Meyer, Baldwin & Doran
ATTORNEYS United States Patent Office 2,783,094
Patented Feb. 26, 1957

PLASTIC HOSE NOZZLE

Lloyd F. Storie, Shaker Heights, Ohio, assignor to The Ulchek Tool Company, Cleveland, Ohio, a corporation of Ohio Application November 4, 1953, Serial No. 390,106

3 Claims. (Cl. 299—136)

This invention relates to improvements in a nozzle and more particularly to a transparent plastic hose nozzle.

The object of the present invention is to provide a nozzle characterized by its structural simplicity, inexpensive manufacturing cost, ease of assembly of its parts, ease of operation, and beauty of appearance.

Other features of this invention reside in the arrangement and design of the parts for carrying out their appropriate functions.

Other objects and advantages of this invention will be apparent from the accompanying drawings and description and the essential features will be set forth in the appended claims.

In the drawings,

Fig. 1 is a side elevational view of the transparent nozzle of the present invention;

Fig. 2 is a longitudinal sectional view through the nozzle in Fig. 1;

Fig. 3 is a side elevational view of the central spindle with the outer cap and sleeve removed;

Fig. 4 is a transverse cross-sectional view through the outlet ports on the central spindle;

Fig. 5 is a transverse sectional view through the O-ring liquid seal between the outlet ports and the nozzle screw thread;

Fig. 6 is a transverse sectional view through the stem looking in the forward direction toward the screw thread segments thereon, while Fig. 7 is a transverse sectional view showing a snap type, stop ring in a solid line position assembled in its retaining groove on the periphery of the spindle and in a dot-dash line position partially disassembled therefrom.

Before the nozzle here illustrated is specifically described, it is to be understood that the invention here involved is not limited to the structural details or arrangement of part here shown since nozzles embodying the present invention may take various forms. It also is to be understood that the phraseology or terminology herein employed is for purposes of description and not of limitation since the scope of the present invention is denoted by the appended claims.

While the nozzle of the present invention may be used and constructed in various ways embodying one or more of the inventive concepts disclosed hereinafter, I have chosen to illustrate the same as a water spray nozzle for a conventional garden hose.

This hose nozzle is attractive in appearance, easy to use, and comfortable to grip in the hand during usage. Substantially all of the parts of this nozzle are made of green tinted, transparent, plastic material with the color chosen to harmonize with the conventional green garden hose and green grass while imparting a sensation of coolness because of the cool green color and its association with water. However, other color tints may be used, such as amber, etc. The transparency makes it possible to determine readily whether or not water is flowing through the nozzle. Also, the transparency imparts beauty and aesthetic appearance to the nozzle and the water flow therein. Of course, it should be noted that if some of these latter mentioned qualities, and others to be mentioned hereinafter, are not desired, the nozzle may be made of translucent or opaque material.

The nozzle includes a spindle member 10 best shown in Figs. 2 and 3 with this spindle being made of transparent plastic material having a liquid flow passageway 10a therethrough with an inlet 10b at one end and laterally directed outlet ports 10c (Figs. 2 and 4) adjacent the opposite end thereof. The inlet end has a hose coupling 10d internally threaded for attachment to the garden hose with a gasket 9 preventing water leakage. The periphery of this coupling has axially or longitudinally extending, closely spaced together serrations for two purposes. First, these serrations provide a convenient hand grip for screwing the nozzle coupling 10d onto the threaded end of the hose. Second, the grooves of these serrations coact with the grooves of the screw thread visible through the transparent coupling 10d to provide an attractive knurled appearance as light reflects on and refracts through the transparent plastic. The close together circumferential spacing of the serrations and the pitch of the thread is about equal so that a uniform square knurl appears.

An outer sleeve member 11 made of transparent plastic material telescopingly surrounds the spindle 10 and laterally extending outlet ports 10c therein.

The sleeve 11 is capable of axial movement relative to the spindle 10 with the sleeve 11 coacting with the outlet ports 10c and a plugged end 10e of the flow passageway 10a to control the character of the spray emitting from the mouth 11a of the sleeve 11 when changed by this relative axial movement. A first screw thread of the acme type is formed on the spindle 10 and sleeve 11 for causing spray controlling axial movement upon relative rotation of the sleeve 11 on the spindle 10 about their longitudinal axis. This thread comprises two protruding thread segments 10f, 10f in Fig. 6 formed on the outer surface of the spindle 10 adapted to travel in a corresponding helical groove 11b in the bore of the sleeve 11. This acme type thread permits rapid and easy axial movement to provide quick spray changes with a minimum of effort.

This spindle 10 is made as a one-piece molded section with the parting line corresponding with the horizontally extending center line in Fig. 6 so that the thread segments 10f, 10f can be accurately and easily made with no interference. This acme type screw thread, as disclosed herein, would be virtually impossible to make on a screw machine so therefore has not been used on a hose nozzle or other applications in this manner.

The periphery of the sleeve 11 tapers to a smaller diameter in the forward direction at the left in Fig. 2 and is especially adapted to provide a comfortable hand grip. Its periphery has circumferentially spaced, longitudinally extending ridges 11c to provide a non-slip but comfortable hand grip when rotating the sleeve on the spindle to change the character of the spray.

A ring seal 12 of the O-ring type in Fig. 2 is located between the outlet ports 10c and the acme type thread 10f, 11b. This seal is resiliently held in a peripheral, annular retaining groove 10g in the spindle 10 so as to coact with the cylindrical bore surface 11d on the sleeve to prevent leakage during relative axial and rotational movement of spindle 10 and sleeve 11.

An end stop cap 13, made of transparent plastic, is detachably secured on the right hand of sleeve 11 adjacent the water inlet. In the present disclosure, the cap is detachably held in place by a screw thread 11e, 13a.

A snap type, split, stop ring 14 in Figs. 2, 3 and 7, generally of C-shape, is made of resilient plastic material and is snapped during assembly into an annular peripheral retaining groove 10h in the spindle 10. This ring 14 is located on the left hand or outlet side of the cap 13 and is positioned to block the axial movement of the cap 13 in the leftward direction toward outlet ports 10c so as to serve as a stop for said cap. It may also be defined as being located on the inlet or right hand side of the acme type thread 10f, 11b between the cap 13 and said thread.

The operation of this nozzle should now be apparent. Rotating the sleeve 11 on the spindle 10 will change the character of the spray emitted on the left hand thereof by causing relative axial movement between the parts. The term "spray," as used in this specification and claims, includes a single jet of small cross sectional area, a coarse spray, a diffused fine spray, and full shut-off of the nozzle since all of these and all gradations therebetween can take place in this spray nozzle. As the sleeve 11 is moved from one type spray to another, the transparency of the sleeve 11 permits one to see the change in character of the water turbulence in the water mixing chamber to the left of the ring seal 12 in Fig. 2 as the spray is being formed so that this change in appearance presents a pleasing sight.

As the sleeve 11 is moved axially toward the right to its farthest position, as shown in Fig. 2, the flow emerging from the cylindrical mouth 11a is shut off. The conical shaped, plugged end 10e of the spindle 10, located beyond or toward the left of the outlet ports 10c, engages the mouth 11a of the sleeve with the annular surfaces on these parts movable into liquid sealing, line contact with each other so as to deform slightly the plastic of which they are composed to cut off liquid flow. The pair of thread segments 10f, 10f in Fig. 3 permits the sleeve 11 to be self-accommodating and self-centering to some degree so that a tight liquid seal will occur. A continuous thread on the surface of the spindle 10 would not permit the freedom of movement of the sleeve 11 which is necessary for a tight seal between plugged end 10e and mouth 11a.

When the sleeve 11 is moved axially toward the left as far as possible so as to provide a jet type water spray emerging from the outlet of the nozzle, the inwardly extending annular and radial flange of cap 13 engages against the right end of the split ring 14 to prevent further axial movement of sleeve 11 toward the left with the ring 14 serving as a stop. Even though screw threads 10f, 11b and 13a, 11e are utilized at two different locations, further rotation of the sleeve 11 will not disassemble the nozzle since the lead of each of these threads is different so that a jamming effect occurs to prevent simultaneous unscrewing of the parts. The lead is the axial distance one part advances relative to the other during one relative rotation, and this lead of the acme type thread 10f, 11b is approximately five times that of thread 11e, 13a so that not only jamming will occur but also the type of spray can be changed quickly, rapidly and easily.

The stop ring 14 has still another function in addition to serving as a stop. It provides a very close seal with its mating parts so as to prevent small dirt particles from entering the thread 10f, 11b from the right hand end in Fig. 2. The resiliency of the plastic material of which the split ring 14 is composed biases it outwardly so that its periphery presses against the circular bore 11f of the sleeve with said bore being coaxial with the axis of sleeve rotation and located between the inwardly directed radial flange of cap 13 and the thread 11b. This bore 11f is tapered down to a smaller diameter in the direction of the nozzle outlet so as to provide a tighter seal as the thread 11b moves toward the right in Fig. 2 closer to ring 14 and to the position wherein dirt and foreign particles may enter past a split ring 14. Hence, the acme type screw thread 10f, 11b is protected against entry of dirt on the right by the split ring seal 14 and is protected against entry of water or other liquid and foreign particles on the left by ring seal 12 so that the sleeve 11 can always rotate smoothly on the spindle 10 whenever the user wants to change the spray furnished by the nozzle.

The nozzle can be quickly assembled with a minimum of effort. The gasket 9 is pushed through the inlet 10b into its retaining counterbore, and then the ring seal 12 is snapped into position on its retaining grooves 10g. The cap 13 is telescoped over the spindle 10 from the left hand end thereof, and then the split stop ring 14 is snapped into its retaining groove 10h to retain the cap thereon. Sleeve 11 is telescoped over the left end of the spindle 10 and rotated over the thread segments 10f. Then, cap 13 is completely screwed onto the right end of the nozzle sleeve 11 either during or after the rotation of sleeve 11 over segments 10f. The taper in bore 11f not only provides a useful function in efficient sealing, but also permits easy assembly of the parts since the right hand end or mouth of this bore 11f is the largest diameter thereof and can be easily telescoped over the split ring 14.

Although the ring seal 12 and the split ring 14 are shown in the preferred construction as being retained in grooves on the periphery of spindle 10, it should be understood that one or both of these could be mounted in grooves in bore 11d or 11f in coaction with a cylindrical or tapered peripheral surface on spindle 10.

Various changes in details and arrangement of parts can be made by one skilled in the art without departing from the spirit of this invention or the scope of the appended claims.

What is claimed is:

1. A liquid spray nozzle for attachment to a hose, comprising a spindle member with a liquid flow passageway therethrough having an inlet and outlet adjacent opposite ends thereof, an imperforate sleeve member surrounding said spindle member and capable of axial movement thereover with said sleeve member coacting with said outlet to control the spray by said relative axial movement, screw threads formed on said spindle and sleeve members for effecting spray controlling axial movement upon rotation of said members about a longitudinal axis, one of said members carrying a ring seal located between said outlet and thread and coacting with a cylindrical surface on the other of said members to prevent leakage into said thread, and a snap type split stop ring made of resilient material snapped into an annular groove in one of said members on the inlet side of said threads to block the axial movement of said sleeve member with said ring extending substantially throughout the length of said groove and pressing against a smooth surface on the other of said members to provide a close seal to prevent foreign particles from entering.

2. A liquid spray nozzle for attachment to a hose, comprising a spindle member with a liquid flow passageway therethrough having an inlet and outlet adjacent opposite ends thereof, an imperforate sleeve member surrounding said spindle member and capable of axial movement thereover with said sleeve member coacting with said outlet to control the spray by said relative axial movement, screw threads formed on said spindle and sleeve members for effecting spray controlling axial movement upon rotation of said members about a longitudinal axis, one of said members carrying a ring seal located between said outlet and thread and coacting with a cylindrical surface on the other of said members to prevent leakage into said thread, and a snap type split stop ring made of resilient material snapped into an annular groove in one of said members on the inlet side of said threads to block the axial movement of said sleeve member with said ring extending substantially throughout the length of said groove and pressing against a smooth conical surface on the other of said members to provide a close seal to prevent foreign particles from entering, said conical surface having a taper providing greater clearance with said ring toward the end of said conical surface closest to said inlet, whereby said taper permits easy assembly of the ring and taper.

3. A liquid spray nozzle for attachment to a hose, comprising a spindle made of plastic material with a liquid flow passageway therethrough having an inlet and a laterally directed outlet adjacent opposite ends thereof, an imperforate sleeve made of plastic material surrounding said spindle and capable of axial movement thereover with said sleeve coacting with said outlet to control the spray by said relative axial movement, said spindle beyond said outlet and said sleeve having annular surfaces movable upon axial movement into line contact with each other to deform the plastic members to cut off liquid flow, a first screw thread of acme type formed on said spindle and sleeve for effecting rapid spray controlling axial movement upon rotation of said sleeve on said spindle about a longitudinal axis, an end stop cap threaded onto said sleeve adjacent the inlet by a second screw thread having a different lead than said first screw thread to prevent disassembly of said cap when changing the character of said spray, said spindle carrying a ring seal located between said outlet and said first thread and coacting with a cylindrical bore on said sleeve to prevent leakage into said threads, said cap having a bore snugly engaging in telescopic arrangement in assembled relationship a cylindrical portion on said spindle with said bore having a diameter at least as large as the outside diameter of said first screw threads on said spindle to permit axial assembly of said cap over said last mentioned screw threads, and a snap type split stop ring made of resilient plastic material snapped into an annular peripheral groove in said spindle on the inlet side of said first screw thread between said cap and first screw thread on said sleeve and extending substantially throughout the length of said groove, said sleeve having a smooth conical bore co-axial with the axis of rotation and located between said cap and first screw thread to block the axial movement of said cap, said conical bore being tapered in the direction of said outlet to a smaller diameter and pressing against the periphery of said stop ring to provide a close seal to prevent foreign particles from entering said first thread and with said taper permitting easy assembly.

References Cited in the file of this patent

UNITED STATES PATENTS

| | | |
|---|---|---|
| 742,133 | Sherman | Oct. 20, 1903 |
| 1,215,796 | Gibbs | Feb. 13, 1917 |
| 2,220,227 | Gifford | Nov. 5, 1940 |
| 2,283,315 | Clemmons | May 19, 1942 |
| 2,358,515 | Jepson | Sept. 19, 1944 |
| 2,474,332 | Sciuto | June 28, 1949 |
| 2,502,500 | Arase | Apr. 4, 1950 |

FOREIGN PATENTS

| | | |
|---|---|---|
| 424,337 | Great Britain | Feb. 11, 1935 |
| 113,160 | Australia | May 22, 1941 |
| 132,676 | Sweden | Aug. 7, 1951 |